US008756062B2

(12) United States Patent  
Talwar et al.

(10) Patent No.: US 8,756,062 B2  
(45) Date of Patent: Jun. 17, 2014

(54) MALE ACOUSTIC MODEL ADAPTATION BASED ON LANGUAGE-INDEPENDENT FEMALE SPEECH DATA

(75) Inventors: Gaurav Talwar, Farmington Hills, MI (US); Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 844 days.

(21) Appl. No.: 12/965,508

(22) Filed: Dec. 10, 2010

(65) Prior Publication Data

US 2012/0150541 A1  Jun. 14, 2012

(51) Int. Cl.
*G10L 15/00* (2013.01)
*G10L 15/06* (2013.01)
*G10L 15/14* (2006.01)

(52) U.S. Cl.
USPC ........................................ 704/256.2; 704/243

(58) Field of Classification Search
USPC ............................................... 704/243, 256.2
See application file for complete search history.

(56) References Cited

U.S. PATENT DOCUMENTS

| | | | | |
|---|---|---|---|---|
| 4,980,917 | A * | 12/1990 | Hutchins | 704/254 |
| 5,572,624 | A * | 11/1996 | Sejnoha | 704/256.2 |
| 5,960,397 | A * | 9/1999 | Rahim | 704/244 |
| 6,064,959 | A * | 5/2000 | Young et al. | 704/251 |
| 6,081,660 | A * | 6/2000 | Macleod et al. | 703/2 |
| 6,101,470 | A * | 8/2000 | Eide et al. | 704/260 |
| 6,356,868 | B1 * | 3/2002 | Yuschik et al. | 704/246 |
| 6,556,969 | B1 * | 4/2003 | Assaleh et al. | 704/256.5 |
| 6,567,776 | B1 * | 5/2003 | Chang et al. | 704/236 |
| 7,177,814 | B2 * | 2/2007 | Gong et al. | 704/270.1 |
| 7,472,061 | B1 * | 12/2008 | Alewine et al. | 704/243 |
| 7,574,359 | B2 * | 8/2009 | Huang | 704/244 |
| 7,668,718 | B2 * | 2/2010 | Kahn et al. | 704/270 |
| 7,778,831 | B2 * | 8/2010 | Chen | 704/246 |
| 8,005,674 | B2 * | 8/2011 | Janke et al. | 704/238 |
| 8,036,893 | B2 * | 10/2011 | Reich | 704/257 |
| 8,229,744 | B2 * | 7/2012 | Dharanipragada et al. | 704/256 |
| 8,275,615 | B2 * | 9/2012 | Kozat et al. | 704/240 |
| 8,423,364 | B2 * | 4/2013 | Yu et al. | 704/256 |
| 8,571,859 | B1 * | 10/2013 | Aleksic et al. | 704/231 |
| 2002/0138265 | A1 * | 9/2002 | Stevens et al. | 704/251 |
| 2005/0038655 | A1 * | 2/2005 | Mutel et al. | 704/256 |
| 2006/0020463 | A1 * | 1/2006 | Reich | 704/257 |
| 2006/0064177 | A1 * | 3/2006 | Tian et al. | 700/1 |
| 2006/0074657 | A1 * | 4/2006 | Huang | 704/246 |

(Continued)

FOREIGN PATENT DOCUMENTS

WO    WO2010030742 A1    3/2010

OTHER PUBLICATIONS

Search Report for DE 10 2011 120 315.3, dated Sep. 19, 2012, 5 pages (not translated).

(Continued)

*Primary Examiner* — Eric Yen
(74) *Attorney, Agent, or Firm* — Anthony Luke Simon; Reising Ethington P.C.

(57) ABSTRACT

A method of generating proxy acoustic models for use in automatic speech recognition includes training acoustic models from speech received via microphone from male speakers of a first language, and adapting the acoustic models in response to language-independent speech data from female speakers of a second language, to generate proxy acoustic models for use during runtime of speech recognition of an utterance from a female speaker of the first language.

15 Claims, 3 Drawing Sheets

(56) References Cited

U.S. PATENT DOCUMENTS

| | | |
|---|---|---|
| 2007/0294082 A1* | 12/2007 | Jouvet et al. .................. 704/231 |
| 2008/0010057 A1 | 1/2008 | Chengalvarayan et al. |
| 2008/0052074 A1* | 2/2008 | Gopinath et al. ............. 704/256 |
| 2008/0097754 A1* | 4/2008 | Goto et al. .................... 704/214 |
| 2009/0119105 A1* | 5/2009 | Kim et al. ..................... 704/244 |
| 2009/0164206 A1* | 6/2009 | Zhanyi et al. ..................... 704/2 |
| 2009/0198494 A1 | 8/2009 | Eckhart et al. |
| 2010/0076765 A1 | 3/2010 | Zweig et al. |
| 2011/0015928 A1* | 1/2011 | Odell et al. ................... 704/257 |

OTHER PUBLICATIONS

M.J.F Gales, D. Pye, P.C. Woodland "Variance Compensation Within the MLLF Framework for Robust Speech Recognition and Speaker Adaptation" Cambridge University Engineering Dept., pp. 1832-1835, Cambridge, England.

* cited by examiner

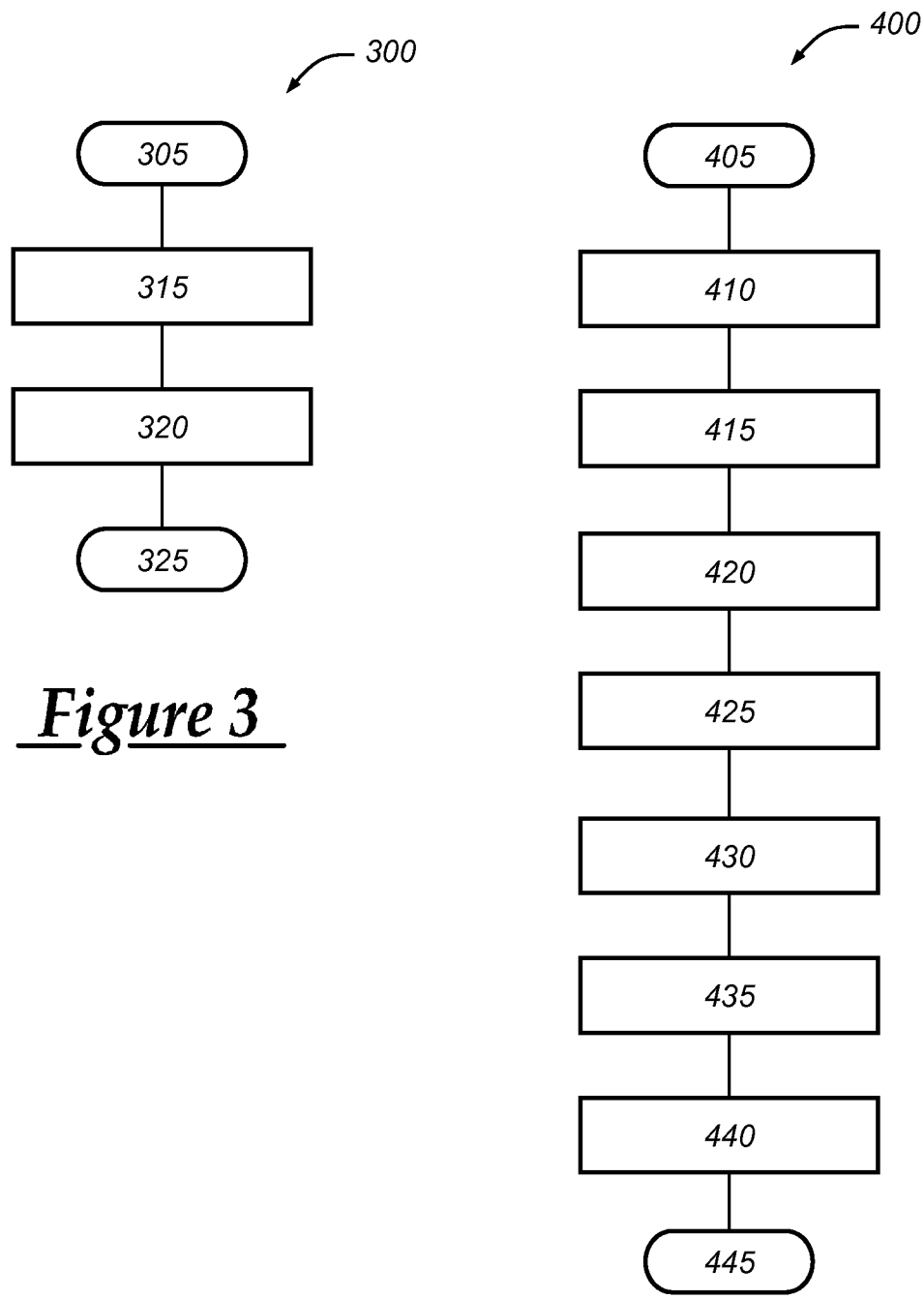

MALE ACOUSTIC MODEL ADAPTATION BASED ON LANGUAGE-INDEPENDENT FEMALE SPEECH DATA

TECHNICAL FIELD

The present invention relates generally to automatic speech recognition.

BACKGROUND OF THE INVENTION

Automatic speech recognition (ASR) technologies enable microphone-equipped computing devices to interpret speech and thereby provide an alternative to conventional human-to-computer input devices such as keyboards or keypads. ASR systems use acoustic models to recognize speech. An acoustic model is a statistical representation of one or more sounds that constitute a speech utterance, like a word, or a phoneme or other sub-word. An acoustic model for an utterance is created by a training process that includes recording audio of multiple instances of the utterance from many people in multiple contexts, and compiling the utterance instances into one or more statistical representations of the utterance. For example, acoustic models for digits 0-9 may be trained by 50 men and 50 women who each utter each digit ten times under one or more conditions. Accordingly, for each digit there will be 500 female utterance instances and 500 male utterance instances. All of the utterance instances for each digit may be compiled into one or more unisex statistical representations of each digit, or the female utterance instances for each digit may be compiled into one or more female statistical representations of each digit and the male utterance instances for each digit may be compiled into one or more male statistical representations of each digit.

But a problem encountered with ASR is that little to no training data may be available for female speakers of certain demographics. For example, in some populations, female acoustic model training data may be difficult or impossible to obtain. In another example, in some populations, many females do not currently drive and, thus, there is a lack of statistically significant in-vehicle female speech data. The lack of such data makes it difficult to improve speech recognition performance for certain female users.

SUMMARY OF THE INVENTION

According to one embodiment of the invention, there is provided a method of generating proxy acoustic models for use in automatic speech recognition. The method includes the steps of (a) training acoustic models from speech received via microphone from male speakers of a first language, and (b) adapting the acoustic models trained in step (a) in response to language-independent speech data from female speakers of a second language, to generate proxy acoustic models for use during runtime of speech recognition of an utterance from a female speaker of the first language.

According to another embodiment of the invention, there is provided a method of automatic speech recognition, including the following steps: (a) receiving an utterance via a microphone from a female speaker of a first language; (b) pre-processing the utterance with an automatic speech recognition pre-processor to generate acoustic feature vectors; (c) determining at least one formant frequency of the received utterance; (d) identifying at least one of a plurality of formant frequency bands in speech data from female speakers of a second language that corresponds to the at least one formant frequency determined in step (c); and (e) adapting acoustic models trained from speech from male speakers of the first language in response to the identifying step (d), to result in proxy acoustic models for the female speaker of the first language.

BRIEF DESCRIPTION OF THE DRAWINGS

One or more preferred exemplary embodiments of the invention will hereinafter be described in conjunction with the appended drawings, wherein like designations denote like elements, and wherein:

FIG. 3 is a flow chart illustrating an exemplary embodiment of a method of generating acoustic models for use in automatic speech recognition that can be carried out by the ASR system of FIG. 2; and FIG. 4 is a flow chart illustrating an exemplary embodiment of a method of automatic speech recognition that can be carried out by the ASR system of FIG. 2.

DETAILED DESCRIPTION OF THE PREFERRED EMBODIMENT(S)

The following description describes an example communications system, an example ASR system that can be used with the communications system, and one or more example methods that can be used with one or both of the aforementioned systems. The methods described below can be used by a vehicle telematics unit (VTU) as a part of recognizing speech uttered by a user of the VTU. Although the methods described below are such as they might be implemented for a VTU, it will be appreciated that they could be useful in any type of vehicle speech recognition system and other types of speech recognition systems. For example, the methods can be implemented in ASR-enabled mobile computing devices or systems, personal computers, or the like.

Communications System—

Figure 1:
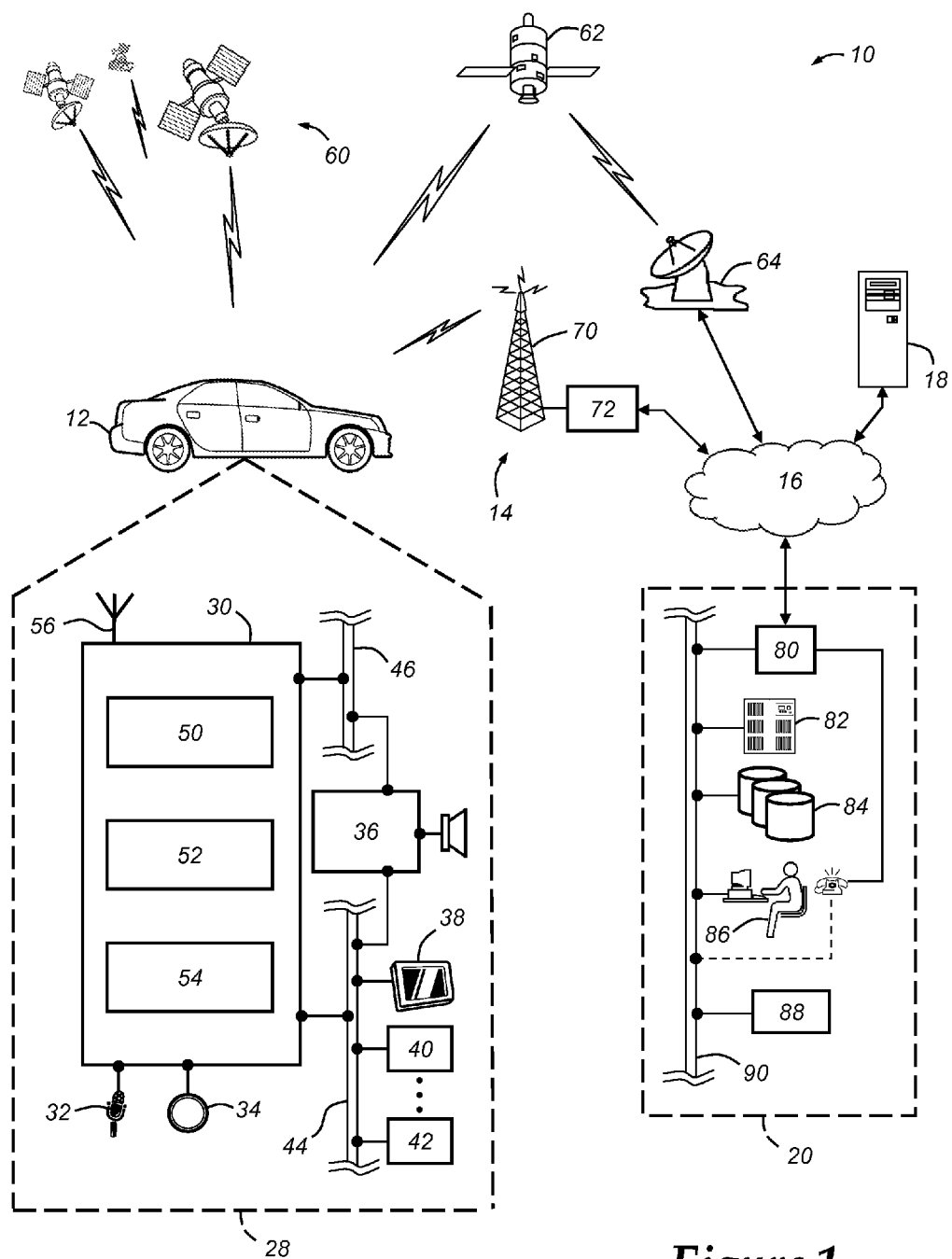
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Automatic Speech Recognition System—

Figure 2:
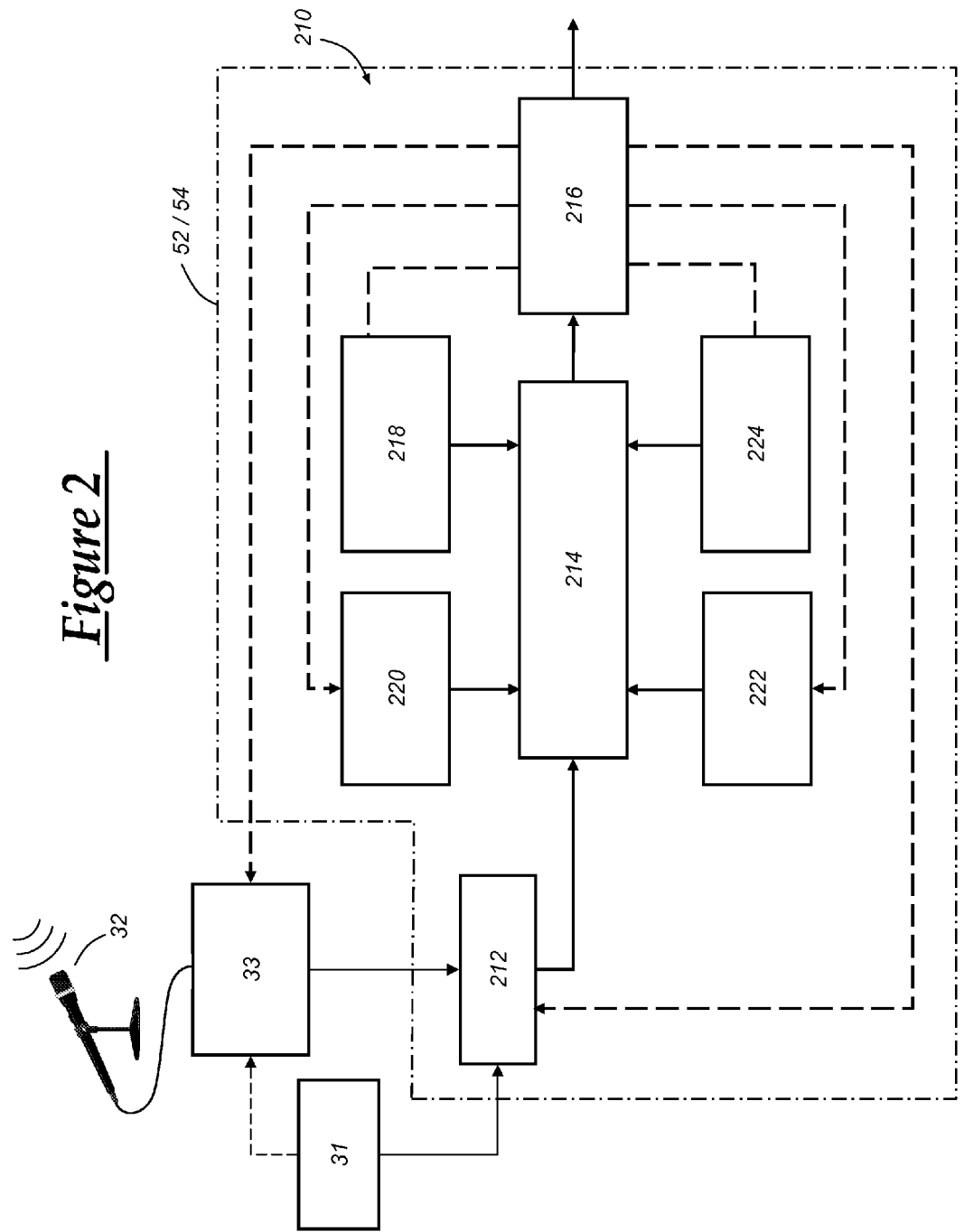
FIG. 2 is a block diagram illustrating an exemplary embodiment of an automatic speech recognition (ASR) system that can be used with the system of FIG. 1 and used to implement exemplary methods of speech recognition.

Turning now to FIG. 2, there is shown an exemplary architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific exemplary ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors, pre-processors, or pre-processor software modules 212 for parsing streams of the acoustic data of the speech into parametric representations such as acoustic features; one or more decoders or decoder software modules 214 for decoding the acoustic features to yield digital subword or word output data corresponding to the input speech utterances; and one or more back-end processors, post-processors, or post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a lexicon or grammar can define a universe of vocabulary the system 210 expects at any given time in any given ASR mode. For example, if the system 210 is in a training mode for training commands, then the lexicon or grammar model(s) 218 can include all commands known to and used by the system 210. In another example, if the system 210 is in a main menu mode, then the active lexicon or grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

Methods—

Turning now to FIGS. 3 and 4, there are shown speech recognition related methods 300, 400 that can be carried out using suitable programming of the ASR system 210 of FIG. 2 within the operating environment of the vehicle telematics unit 30 as well as using suitable hardware and programming of the other components shown in FIG. 1. Such programming and use of the hardware described above will be apparent to those skilled in the art based on the above system description and the discussion of the method described below in conjunction with the remaining figures. Those skilled in the art will also recognize that the methods can be carried out using other ASR systems within other operating environments.

In general, an acoustic model generation method 300 improves automatic speech recognition by adapting acoustic models trained from speech received from male speakers of a first language, in response to language-independent speech data from female speakers of a second language. Accordingly, proxy acoustic models are generated for use during runtime of speech recognition of an utterance from a female speaker of the first language. Recognition of speech from the female speaker is improved because good female proxy acoustic models of a given language can be used, despite the unavailability of acoustic model training data for certain females.

Referring to FIG. 3, the method 300 begins in any suitable manner at step 305.

At step 310, acoustic models may be trained using male speakers of a first language. Acoustic model training may include maximum likelihood estimation techniques, minimum classification error techniques, conditional maximum likelihood techniques, which techniques are generally well known to those of ordinary skill in the art and any other suitable techniques may be used. The acoustic models may be word models, phoneme models, or sub-word models. Any suitable quantity of male speakers may be used. The first language may be Arabic, Chinese, or any other language.

At step 315, the acoustic models trained in step 310 are adapted in response to language-independent speech data from female speakers of a second language, to generate proxy acoustic models for use during runtime of speech recognition of an utterance from a female speaker of the first language. For example, maximum likelihood linear regression (MLLR) techniques may use speech data from female speakers of English to adjust central frequencies of acoustic models of Arabic male speech. Any suitable MLLR technique(s) may be used and are well known to those of ordinary skill in the art as reflected by Variance compensation within the MLLR framework for robust speech recognition and speaker adaptation, Gales, M., D. Pye, and P. Woodland, In Proc. ICSLP, pp. 1832-1835, (1996).

At step 320, the proxy acoustic models generated in step 315 can be used during runtime of automatic speech recognition, for recognizing speech from a female speaker of the first language.

At step 325, the method may end in any suitable manner.

In one embodiment of step 315, the acoustic models are adapted before speech recognition runtime. For example, maximum likelihood linear regression techniques, or any other suitable adaptation techniques, can be used in applying a template of formant frequencies and frequency bands of the language-independent speech data to adjust central frequencies of the acoustic models to result in the female proxy acoustic models.

In another embodiment of step 315, the acoustic models are adapted during speech runtime. This embodiment is described in further detail below with reference to FIG. 4 and method 400.

In general, the speech recognition method 400 improves speech recognition by adapting acoustic models trained from speech from male speakers of a first language in response to identifying at least one of a plurality of formant frequency bands in speech data from female speakers of a second language that corresponds to at least one formant frequency in speech received from a female speaker of the first language. Recognition of speech from the female speaker is improved because good female proxy acoustic models of a given language can be used, despite the unavailability of acoustic model training data for certain females.

Referring to FIG. 4, the method 400 begins in any suitable manner at step 405. For example, a vehicle user starts interaction with the user interface of the telematics unit 30, preferably by depressing the user interface pushbutton 34 to begin a session in which the user inputs voice commands that are interpreted by the telematics unit 30 while operating in speech recognition mode. Using the audio system 36, the telematics unit 30 can acknowledge the pushbutton activation by playing a sound or providing a verbal request for a command from the user or occupant. The method 400 is carried out during speech recognition runtime.

At step 410, speech is received in any suitable manner. For example, the telematics microphone 32 can receive speech uttered by a user, and the acoustic interface 33 can digitize the speech into acoustic data. In one embodiment, the speech is a command, for example, a command expected at a system menu. In a more particular embodiment, the command is a first command word at a system main menu after the method 300 begins. The speech may include one or more utterances.

At step 415, the received speech is pre-processed to generate acoustic feature vectors. For example, the acoustic data from the acoustic interface 33 can be pre-processed by the pre-processor module(s) 212 of the ASR system 210 as described above.

At step 420, language-independent speech data of the received speech is determined. For instance, pitch and/or one or more formant frequencies of the received speech may be estimated, detected, or otherwise determined in any suitable manner. In one example, cepstral analysis provides a good estimate of fundamental harmonics, pitch frequency, and the like, and provides information about glottal pulses and vocal tract response. Other examples may include zero-crossing rate analysis in the time domain of the speech signal, linear prediction coding algorithms, and/or autocorrelation analysis of speech in the time domain. Such techniques are well-known to those of ordinary skill in the art as reflected in various publications including Oppenheim, A. V., Johnson, D. H. (1972) Discrete representation of signals, Proceedings of the IEEE, vol. 60, no. 6, pp. 681-691, June 1972; Speech and Audio Signal Processing, Processing & Perception of Speech and Music, Ben Gold and Nelson Morgan, John Wiley & Sons, 2001; and Fundamentals of Speech Recognition, Lawrence Rabiner & Biing-Hwang Juang, Prentice Hall, 1993.

At step 425, a speech recognition pre-processor may identify language-independent speech data from female speakers of a second language that corresponds to the language-independent speech data determined in step 420. For example, the language-independent speech data may include pitch and/or at least one of a plurality of formant frequency bands or bins from speech by the female speakers of the second language. The speech data from the female speakers of the second language may include a database of pre-recorded speech utterances, statistical models, one or more templates of formant frequency of the speech utterance, and/or the like. In a specific illustration, the speech data may include a template distribution of formant frequencies including 20 bands or bins of overlapping frequency ranges and spaced apart central frequencies. First formant frequencies in the template may range from 600 Hz to 1200 Hz over 12 of the 20 bins with 50 Hz spacing. In this case, an utterance from the female speaker of the first language may include a formant frequency of 900 Hz that corresponds to the eighth band or bin of the template.

At step 430, acoustic models trained from speech from male speakers of the first language are adapted in response to the identification of the language-independent speech data from step 425. Acoustic model adaptation is generally well known to those of ordinary skill in the art and any suitable techniques may be used. For example, the acoustic models may be adapted by frequency warping the acoustic models with formant frequency data from the female speaker of the first language so that the acoustic models are adapted for better fit with the received speech. A particular technique that may be used includes vocal tract length normalization (VTLN) wherein pitch and/or formant frequencies for the female speaker of the first language are used to adapt the male acoustic models. VTLN is well known to those of ordinary skill in the art as reflected by Vocal Tract Length Normalization in Speech Recognition-Compensation for Systematic Speaker Variability, Kamm. T., Andreou A, Cohen J., Proceedings of 15th Annual Speech Research Symposium, Baltimore, Md., June 1995.

In one embodiment, the formant frequency of the determining step 420 may include an average of a plurality of formant frequencies of the received utterance. More specifically, the plurality of formant frequencies of the received utterance may include at least one of a first formant, a second formant, or a third formant. In one example, the first formant frequency may be characterized as follows: Mean F1=F1(consonant1)+F1(Consonant2)+F1(Vowell)+F1(Consonant3) ... F1(Nth Syllable)/N. Similar characterizations may apply for F2 and/or F3 formants.

In another embodiment, the formant frequency of the determining step 420 includes a first formant, a second formant, and a third formant. In this example, the three formant frequencies namely, F1, F2 and F3, are used to readjust the central frequencies of filter bands in the male acoustic models. If $F_{Central}$=function ($F_1$, $F_2$, $F_3$), then $\lambda_{Transformed}$=function ($\lambda_{Male}$, $F_{central}$).

Continuing with the example from step 425, any suitable frequency warping techniques can be performed on the male acoustic models based on the identified frequency being in a particular band or bin, e.g. the eighth band or bin. Accordingly, the acoustic models may be frequency warped on a band-wise basis.

At step 435, the generated acoustic feature vectors are decoded using the adapted acoustic models from step 425 to produce a plurality of hypotheses for the received speech. For example, the plurality of hypotheses may be an N-best list of hypothesis, and the decoder module(s) 214 of the ASR system 210 can be used to decode the acoustic feature vectors.

At step 440, the plurality of hypotheses is post-processed to identify one of the plurality of hypotheses as the received speech. For example, the post-processor 216 of the ASR system 210 can post-process the hypotheses to identify the first-best hypothesis as the received speech. In another example, the post-processor 216 can reorder the N-best list of hypotheses in any suitable manner and identify the reordered first-best hypothesis.

At step 445, the method 400 may end in any suitable manner.

The methods or parts thereof can be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the invention can be applied to other fields of speech signal processing, for instance, mobile telecommunications, voice over internet protocol applications, and the like. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of generating proxy acoustic models for use in automatic speech recognition, comprising the steps of:
   (a) training acoustic models from speech received via microphone from male speakers of a first language using an automatic speech recognition (ASR) system comprising the microphone, memory, and a processor; and
   (b) adapting the acoustic models trained in step (a) using the ASR system in response to language-independent speech data from female speakers of a second language, to generate proxy acoustic models for use during runtime of speech recognition of an utterance from a female speaker of the first language.

2. The method of claim 1, wherein the adapting step (b) is carried out before speech recognition runtime.

3. The method of claim 1, wherein the adapting step (b) is carried out on the utterance from the female speaker of the first language during speech recognition runtime.

4. The method of claim 3, wherein the adapting step (b) is carried out in response to an identification of at least one of a plurality of formant frequency bands in the speech data from the female speakers of the second language that corresponds to at least one formant frequency determined in the utterance from the female speaker of the first language.

5. The method of claim 4, wherein the adapting step (b) is carried out by frequency warping the acoustic models trained in step (a) in response to the identification of the at least one of the plurality of formant frequency bands in the speech data from the female speakers of the second language.

6. The method of claim 4, wherein the at least one formant frequency determined in the utterance from the female speaker of the first language is an average of a plurality of formant frequencies in the received utterance.

7. The method of claim 6, wherein the plurality of formant frequencies in the received utterance are from at least one of a first formant, a second formant, or a third formant.

8. The method of claim 6, wherein the at least one formant frequency of the determining step (c) includes a first formant, a second formant, and a third formant.

9. A method of automatic speech recognition, comprising the steps of:
   (a) receiving an utterance via a microphone from a female speaker of a first language;
   (b) pre-processing the utterance with an automatic speech recognition pre-processor to generate acoustic feature vectors;
   (c) determining at least one formant frequency of the received utterance;
   (d) identifying at least one of a plurality of formant frequency bands in speech data from female speakers of a second language that corresponds to the at least one formant frequency determined in step (c); and
   (e) adapting acoustic models trained from speech from male speakers of the first language in response to the identifying step (d), to result in proxy acoustic models for the female speaker of the first language, wherein the method is carried out using an automatic speech recognition (ASR) system comprising the microphone, memory, and a processor.

10. The method of claim 9, further comprising the step of (f) decoding the acoustic feature vectors generated in step (b) using a processor and the acoustic models adapted in step (e) to produce a plurality of hypotheses for the received utterance.

11. The method of claim 10, further comprising the step of (g) post-processing the plurality of hypotheses to recognize one of the plurality of hypotheses as the received speech.

12. The method of claim 9 wherein the at least one formant frequency of the determining step (c) is an average of a plurality of formant frequencies of the received utterance.

13. The method of claim 12, wherein the plurality of formant frequencies of the received utterance includes at least one of a first formant, a second formant, or a third formant.

14. The method of claim 9, wherein the at least one formant frequency of the determining step (c) includes a first formant, a second formant, and a third formant.

15. The method of claim 9, wherein the adapting step (e) includes frequency warping the acoustic models to result in the proxy acoustic models.

\* \* \* \* \*